(12) United States Patent
Morales et al.

(10) Patent No.: US 8,243,304 B2
(45) Date of Patent: Aug. 14, 2012

(54) ENHANCED JOB PROGRAMMING FOR PAD PRINTING

(75) Inventors: Javier A. Morales, Irondequoit, NY (US); Michael E. Farrell, Ontario, NY (US); William S. Jacobs, Los Angeles, CA (US)

(73) Assignee: Xerox Corporation, Norwalk, CT (US)

( * ) Notice: Subject to any disclaimer, the term of this patent is extended or adjusted under 35 U.S.C. 154(b) by 1415 days.

(21) Appl. No.: 11/643,474

(22) Filed: Dec. 21, 2006

(65) Prior Publication Data

US 2008/0151285 A1 Jun. 26, 2008

(51) Int. Cl.
*G06F 3/12* (2006.01)
(52) U.S. Cl. ................ 358/1.15; 358/1.1; 358/1.13
(58) Field of Classification Search .......... 358/1.1, 358/1.15, 1.13
See application file for complete search history.

(56) References Cited

U.S. PATENT DOCUMENTS

2004/0187073 A1* 9/2004 Tuijn et al. .................. 715/500
2008/0079963 A1* 4/2008 Matsubara .................. 358/1.9

* cited by examiner

*Primary Examiner* — King Poon
*Assistant Examiner* — Iriana Cruz
(74) *Attorney, Agent, or Firm* — Fay Sharpe LLP

(57) ABSTRACT

A system and method of job programming in a computer system for programming print jobs for pad printing. Parameters are programmed by a user for printing a pad, and the programming involves one or more of the following programming steps: programming a slip sheet parameter, programming insert sheet parameters, and for each first sheet insertion point, an insertion frequency, and programming cover sheet parameters. The slip sheet parameter includes at least a yes value or a no value. The insert sheet parameters include one or more first sheet insertion points and, for each first sheet insertion point programmed, an insertion frequency.

20 Claims, 13 Drawing Sheets

COLLATED STACKS.
3 PAGES, 10 COPIES

UNCOLLATED STACKS
3 PAGES, 10 COPIES

UNCOLLATED PRINTING
3 PAGES, 10 COPIES, SLIP SHEETS

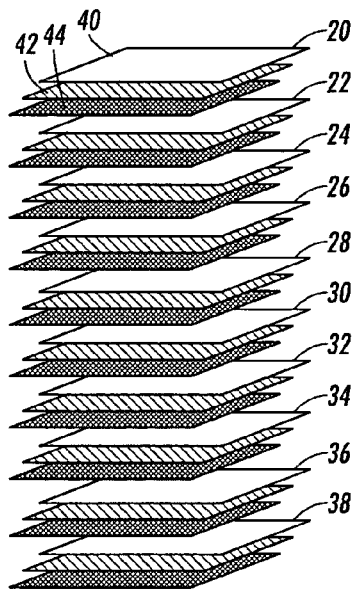
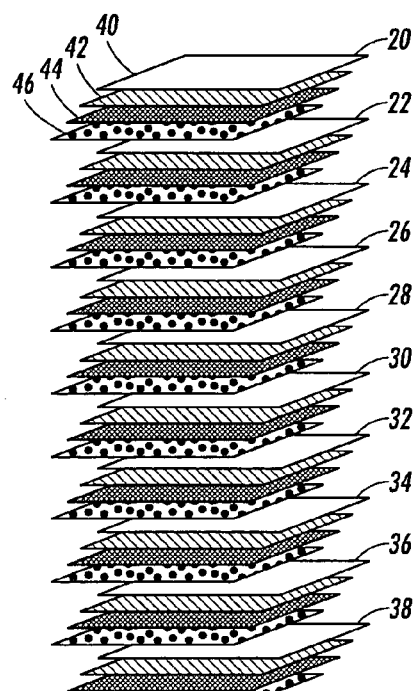
COLLATED STACKS
3 PAGES, 10 COPIES
FIG. 3
(PRIOR ART)
COLLATED STACKS
3 PAGES, 10 COPIES
FIG. 4
(PRIOR ART)

UNCOLLATED PRINTING
3 PAGES, 10 COPIES,
INSERT EVERY 5 SHEETS

UNCOLLATED PRINTING
3 PAGES, 10 COPIES, INSERT EVERY 5,
SLIP SHEETS

UNCOLLATED PRINTING
3 PAGES, 10 COPIES, INSERT EVERY 4,
THEN EVERY 6

COLLATED STACKS.
3 PAGES, 10 COPIES

ENHANCED JOB PROGRAMMING FOR PAD PRINTING

BACKGROUND

The present exemplary embodiment relates to the printing of pads, where multiple copies of one or more printed sheets are glued together to a heavier stock or to a cardboard backing. It finds particular application in conjunction with job programming for pad printing, with particular attention to a unique set of job programming requirements not satisfied by current job programming methods, and will be described with particular reference thereto. However, it is to be appreciated that the present exemplary embodiment is also amenable to other like applications.

Efficient pad printing programming has presented a challenge to the digital publishing and printing workflow. The current solutions on the market enable pad printing in either a very inefficient manner or in a very inelegant manner. For example, current solutions oftentimes create a page description language (PDL) that contains multiple copies of the same page, or split a pad printing job into multiple jobs wherein each job is programmed separately.

Thus, there is a need for enhanced job ticketing features that will enable efficient pad printing programming.

BRIEF DESCRIPTION

A method of job programming in a computer system for programming print jobs for pad printing is provided. Parameters are programmed by a user for printing a pad, and the programming includes one or more of the following programming steps: programming a slip sheet parameter, programming insert sheet parameters, and for each first sheet insertion point, an insertion frequency, and programming cover sheet parameters. The slip sheet parameter is selected from yes value or a no value. The insert sheet parameters include one or more first sheet insertion point and, for each at least one first sheet insertion point, an insertion frequency. The cover sheet parameters include at least a yes value or a no value.

Also provided is a method of programming, in a computer system for programming print jobs, features for printing a pad based on an input document. The method including programming by a user one or more of a front cover feature, a non-uniform pad size feature, and a system data feature.

Further, there is provided a system for programming jobs for pad printing. The system includes a graphical user interface for receiving input from a user. The input includes programming instructions for printing a pad based on an input document. The programming instructions include one or more of: front cover instructions, non-uniform pad size instructions, and system data instructions. Computer instructions are included for generating printer instructions and for assembling the input document and generated printer instructions based on the programmed instructions. A storage device is included for storing the input document, the programming instructions, and the computer instructions, while random access memory is included for temporarily storing portions of: the document, the programming instructions, and the computer instructions. A processor is included for controlling all operations of the system, and a network interface is included for communicating with other systems.

BRIEF DESCRIPTION OF THE DRAWINGS

FIG. 3 is a prior art collated stack of documents for a printed pad;

FIG. 4 is a prior art collated stack of documents including slip sheets for a printed pad;

DETAILED DESCRIPTION

Programming a print job is often achieved with a "job ticket". For many printing systems, the job ticket is provided in the form of one or more programmable dialogs, each programmable dialog including values which are selected with a user interface, such as, e.g., the user interface found in a DocuTech™ printing system manufactured by Xerox Corporation. Job tickets can vary dramatically in both structure and functionality. In one instance, the job ticket may assume the form of a relatively simple dialog displayed on a liquid crystal display ("LCD"). Attributes of a corresponding job, such as desired image processing, designated stock and finishing characteristics may be displayed for setting of suitable output values, e.g., stock size. Background information for job tickets, and an approach for setting attribute values therein, can be found in U.S. Pat. No. 5,271,065 to Rourke et al., the entire contents of which are incorporated herein by reference. Programming for the printing of pads in particular, where the printed sheets are later glued together to heavier stock or to a cardboard backing, presents a unique set of job programming requirements that is not satisfied by existing job programming methods available on current printing systems.

Figure 1:
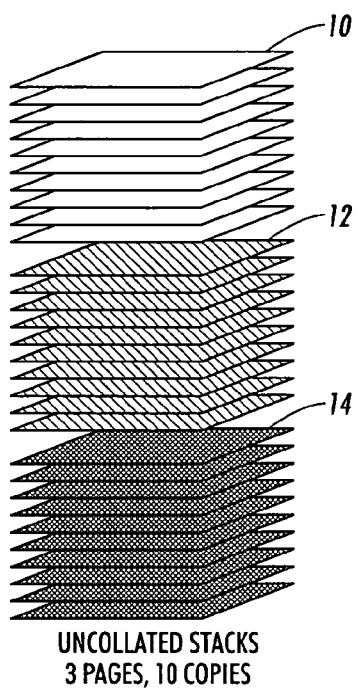
FIG. 1 is a prior art uncollated stack of documents for a printed pad.

With reference to FIG. 1, a pad including uncollated copies of three unique printed pages 10-14 is shown for exemplary purposes. In the exemplary pad shown, it is noted that no special programming is required because each of the three pages 10-14 is printed without any demarcation sheets produced between pages. Consequently, production of the final printed pad product requires a separate process to insert any demarcation sheets or backing sheets to the pads.

Figure 2:
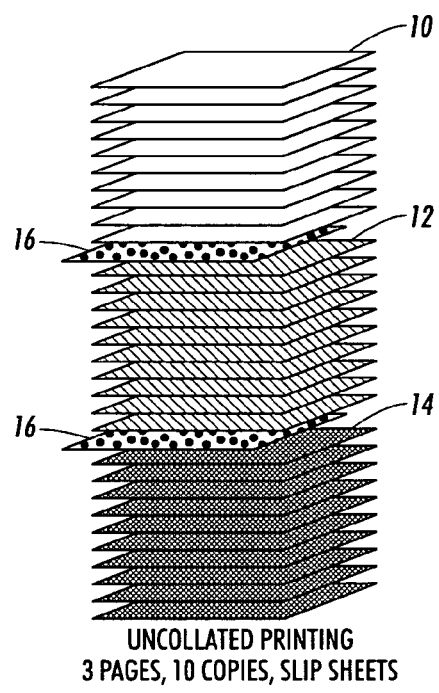
FIG. 2 is a prior art uncollated stack of documents including slip sheets for a printed pad.

With reference now to FIG. 2, the same printed pad including the uncollated copies of printed pages 10-14 is shown with slip sheets 16 inserted following the first two sets of pages 10, 12. In this case, the printing system or reprographic system can be programmed by means of job ticketing or other known means to insert the slip sheet 16 between each set copies, and such programming is known in the art. However, the figure illustrates several problems related to pad printing. For example, although existing programming techniques enable the insertion of the slip sheets 16 between page sets, there is currently no provision to insert a slip sheet following the last page set 14. Further, no mechanism is provided to demarcate pads except for the unique case where exactly one pad per printed page set is desired.

The previous two examples shown with reference to FIGS. 1 and 2 illustrate printed pads made up of uncollated stacks of printed document pages. With reference now to FIG. 3, a printed pad is shown, including ten copies 20-38 of three different preprinted pages 40-44 which are collated into each of the ten copies. As with the example in FIG. 1, no special programming is required to produce the collated pad except for programming the collating of each of the preprinted pages 40-44. With reference now to FIG. 4, the same printed pad as shown in FIG. 3 is shown again, but with slip sheets 46 inserted as backing sheets between each set of collated pages 40-44. As with the example shown in FIG. 2, current programming methods as known in the art can be used to produce the printed pads shown. However, unless exactly one printed document per pad is acceptable, as shown in the Figure, there is no mechanism provided to demarcate the multi-part pads. For example, should it be desirable to produce printed pads including two sets of collated pages 40-44, i.e., two documents per pad, no specific mechanism is currently available for doing so. Again, as with the uncollated pages, there is no mechanism provided to specify a backing sheet for the last pad.

Figure 5:
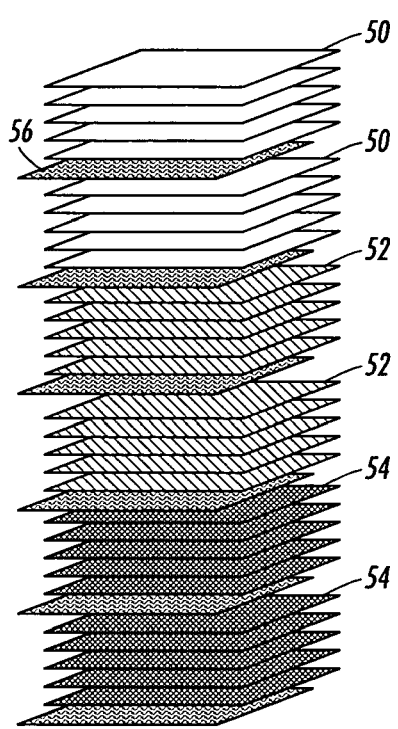
FIG. 5 is an uncollated stack of documents including insert sheets at a fixed frequency for a printed pad.

With reference now to FIG. 5, a stack of printed pads is shown which illustrates novel features of an embodiment of the present application. The set of pads shown includes pads made up of uncollated sets of printed pages 50-54, each pad being demarcated by an insert sheet 56. Thus, in the example shown, the system is programmed to include an insert sheet 56 after every fifth printed output page. Because, in the example shown, the system is programmed to print ten copies of each preprinted page, this results in sheets inserted not only between each set of document pages 50-54, but also midway through each set of pages. Of course, the arrangement shown is for exemplary purposes only, and the uncollated printing can include any number of copies of any number of document pages with inserts programmed at any predetermined frequency.

Figure 6:
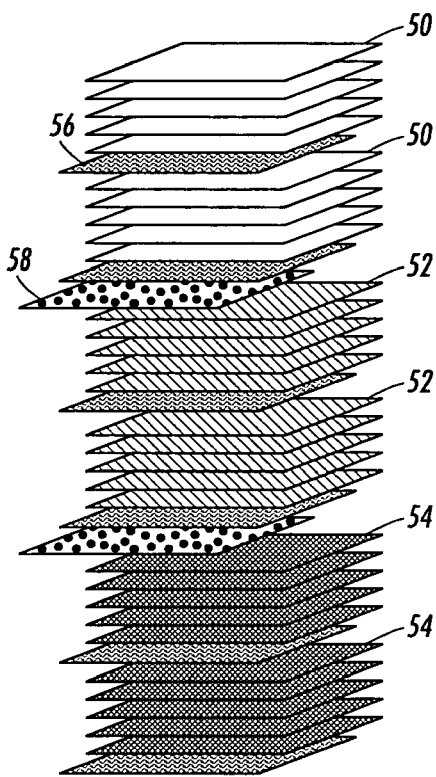
FIG. 6 is an uncollated stack of documents including insert sheets at a fixed frequency and slip sheets for a printed pad.

With reference to FIG. 6, a variation of the example shown in FIG. 5 is illustrated. The printed pad set shown in FIG. 6 is similar With regard to the number of copies and number of input documents and insert sheet frequency, however, the example shown is also programmed to have slip sheets inserted between each set of copies. It is to be noted that, while programming insertion of the slip sheets 58 is known in the art, programming insertion of the insert sheets 56 at a specified frequency is novel behavior.

Figure 7:
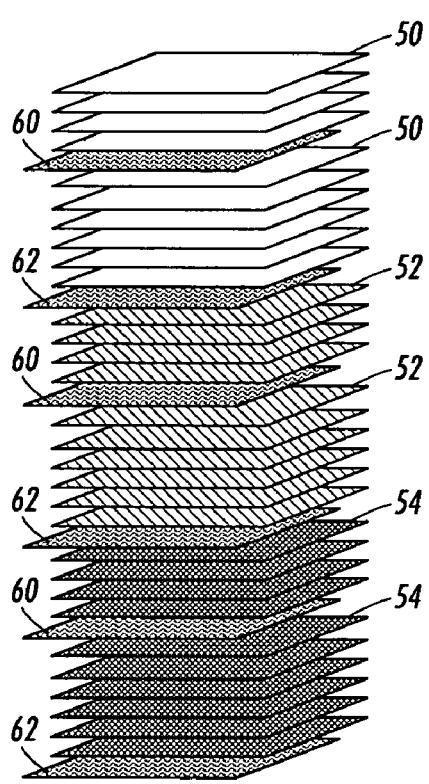
FIG. 7 is an uncollated stack of documents including insert sheets at multiple frequencies for a printed pad.

With reference now to FIG. 7, a stack of printed pads is shown having a non-uniform number of pages per pad. In one embodiment of the present application, multiple insert sheet frequencies may be specified to accommodate such instances having a non-uniform number of pages per pad. In the example shown, the stack includes three different pages 50-54, however, the first insert sheet 60 and the second insert sheet 62 have been programmed at different frequencies. The first insert sheet 60 has been programmed to be inserted after the first four copies of each page, while the second insert sheet 62 has been programmed to be inserted every six copies thereafter within each set of copies of a printed page. It is to be noted that the printed stack shown is exemplary only, and the number of pages and number of insert page frequencies is not limited.

Figure 8:
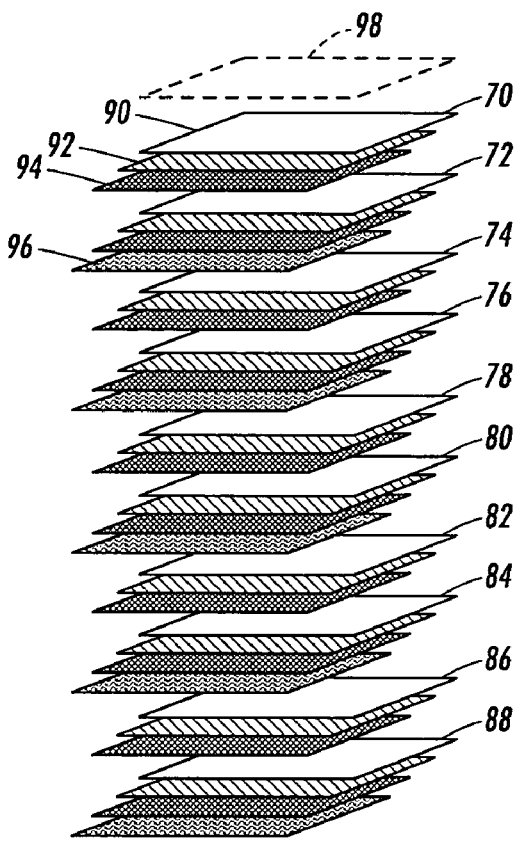
FIG. 8 is a collated stack of documents including insert sheets at a fixed frequency for a printed pad.

With attention directed now to stacks of printed pads having collated pages, and with reference to FIG. 8, a printed stack of pads includes multiple sets of copies 70-88, with each set of copies including three unique pages 90-94. In one embodiment of the present application, when programming insert sheets into printed pads having collated sheets, the system enables programming of the insert sheets at specified set frequencies. For example, as shown, insert sheet 96 is programmed for insertion after every second set of collated copies. The present application is not so limited however, and multiple set frequencies are provided in some embodiments.

It is to be appreciated that the examples described above with reference to FIGS. 5-8 are simplified for the sake of explaining concepts of the present application. In a preferred embodiment of the present application, multiple insertion points and variable repetition factors are enabled. In other words, not only are the insertion points and repetitions independent of each other, but variable repetitions and/or insertion points can be programmed throughout the document for both collated and uncollated printing.

In the exemplary cases of uncollated printing and collated printing shown in FIGS. 5-6, embodiments of the present application permit programming of a pad front cover to be printed on top of each pad. This is represented by dashed line 98 in FIG. 8 representing a front cover for the first set of copies 70, 72. The front cover for the remaining pads is not shown in the figure in order not to unnecessarily complicate the figure. This front cover page may resemble nominal print document cover pages, but may also include information unique to each specific pad such as, e.g., sheet quantity or, in the case of collated printing, multi-part form quantity. Available system supplied data may be combined with the input document PDL data for generation of a cover sheet. Further the cover sheet may be printed on a blank sheet or it may be printed as a watermark on either an additional pad page as shown or on the first page of the printed pad.

Figure 9:
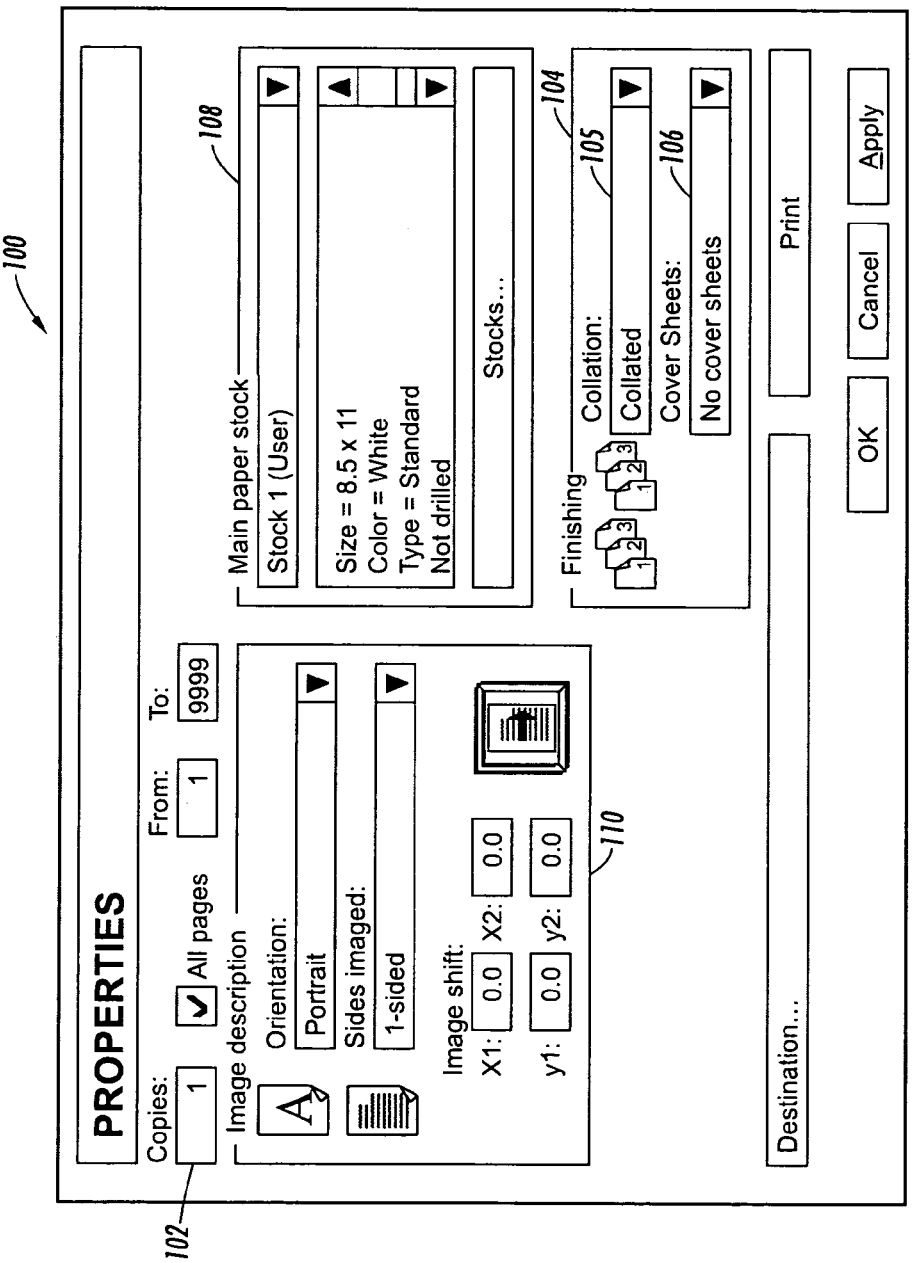
FIG. 9 is an exemplary programming screen for programming parameters for a pad printing job.

With reference now to FIG. 9, an exemplary properties programming screen 100 of an embodiment of the present application is shown for programming selected properties of a pad printing job. The properties menu includes, e.g., a number-of-copies box 102 for specifying either a number of copies of each page in an uncollated printing or, in the case of a collated printing, a number of sets of collated pages. It should be understood that, for the sake of simplicity, only one box is shown for entering number of copies overall, the scope of the present application includes programming a number of copies for each individual page included in the printed pads. This can be accomplished, e.g., by adding additional programming boxes or, alternately, by allowing entry of multiple sets of paired page number and number of copies. Also shown in the properties screen 100 is a finishing selection area 104 including a collation selection box 105 for selecting either collated printing or uncollated printing. There is further provided a cover sheet programming area 106 for programming cover sheet options and selecting system data to be combined with the PDL document data for inclusion on the cover sheet. Also provided is a paper stock selection area 108 and an image description programming area 110 for programming other aspects of the printed pads.

Figure 10:
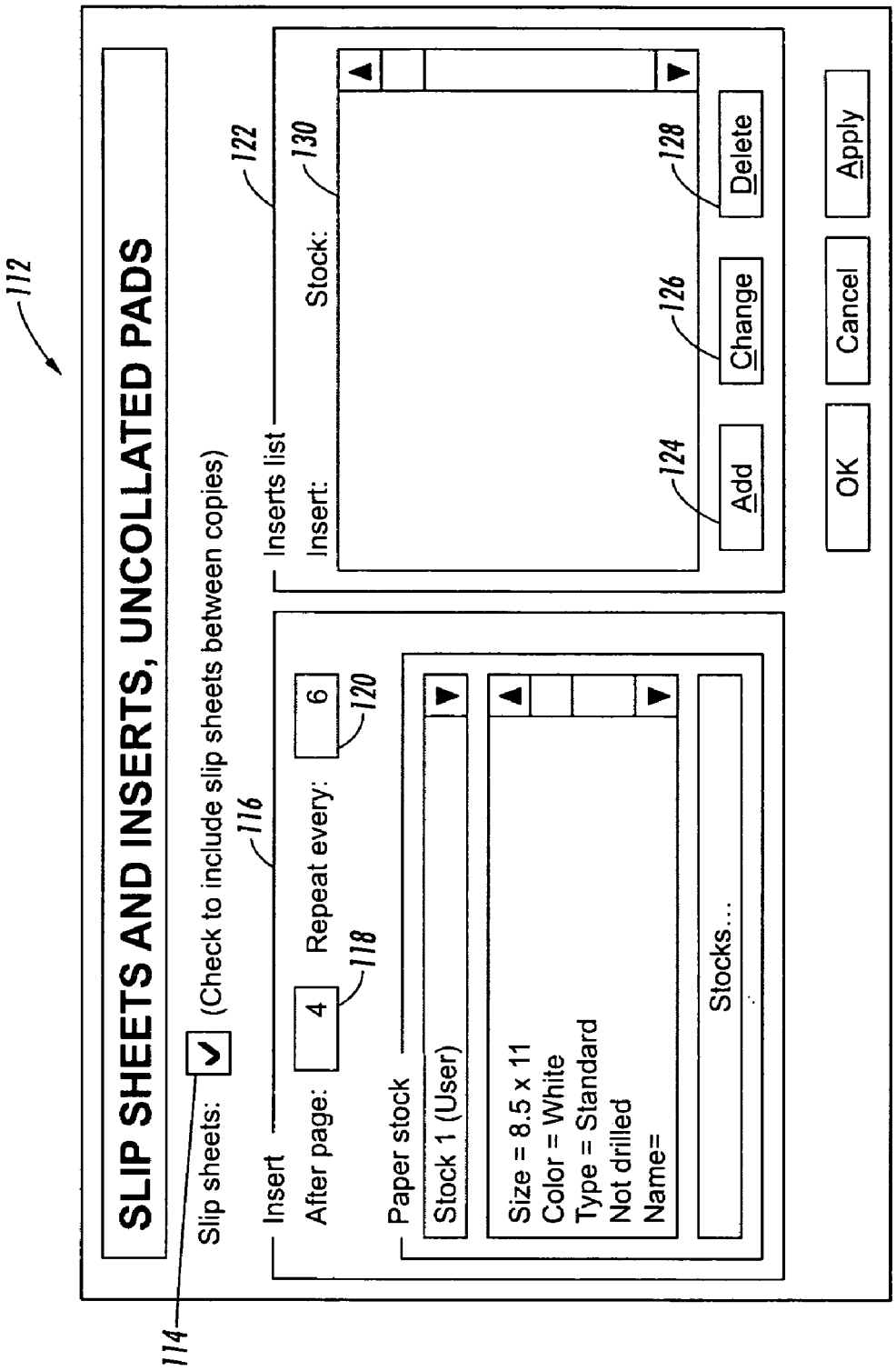
FIG. 10 is an exemplary programming screen for programming slip sheet and insert sheet parameters for a pad printing job utilizing uncollated documents.

FIG. 10 shows a slip sheet and insert sheet programming screen 112 for programming uncollated pads used in conjunction with the previously shown properties programming screen. The programming screen shown includes a slip sheet selection box 114 for programming a slip sheet option. Also included is an insert programming area 116 providing, e.g., an after page box 118 and a repetition factor box 120 for programming the initial insert point and frequency of an insert sheet. Although only a single page and repetition factor have been shown in the page and repetition factor boxes 118,120, in preferred embodiments of the present application, multiple insertion points and variable repetition factors can be programmed in either box, or by alternate programming means, so that the insertion points and repetitions can be essentially independent of each other, and variable repetitions and/or insertion points can be programmed throughout the document for both collated and uncollated printing. Also included is an inserts list programming area 122 which provides an add button 124 for adding an insert selection programmed in insert programming area 116, a change button 126 for editing a previously programmed insert sheet option, and a delete button 128 for deleting a previously programmed insert sheet. An insert list box 130 is also provided for showing the currently programmed insert sheets.

Figure 11:
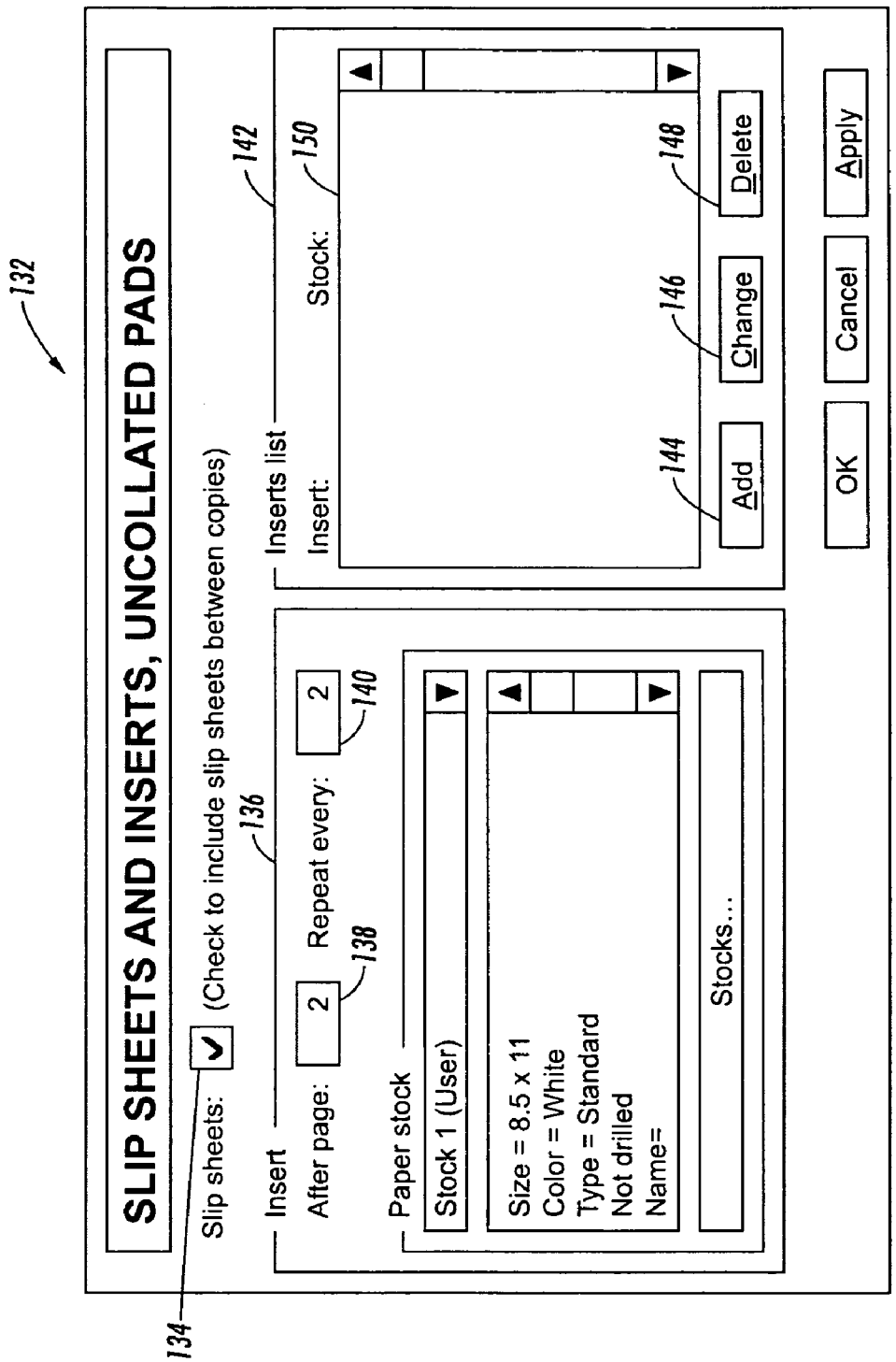
FIG. 11 is an exemplary programming screen for programming slip sheet and insert sheet parameters for a pad printing job utilizing collated documents.

FIG. 11 shows an alternate slip sheet and insert programming screen 132 for programming collated pads. The features included are similar to the previously shown programming screen for uncollated pads including a slip sheet selection box 134 and an insert programming area 136. The insert programming area 136 includes an after page box 138 for programming the initial insert point for an insert sheet and a frequency box 140 for specifying the frequency of the insert sheet in terms of number of sets between inserted sheets. An inserts list area 142 is also provided with function buttons for adding 144, changing 146, and deleting 148 previously programmed inserts shown in the inserts list box 150.

Figure 12:
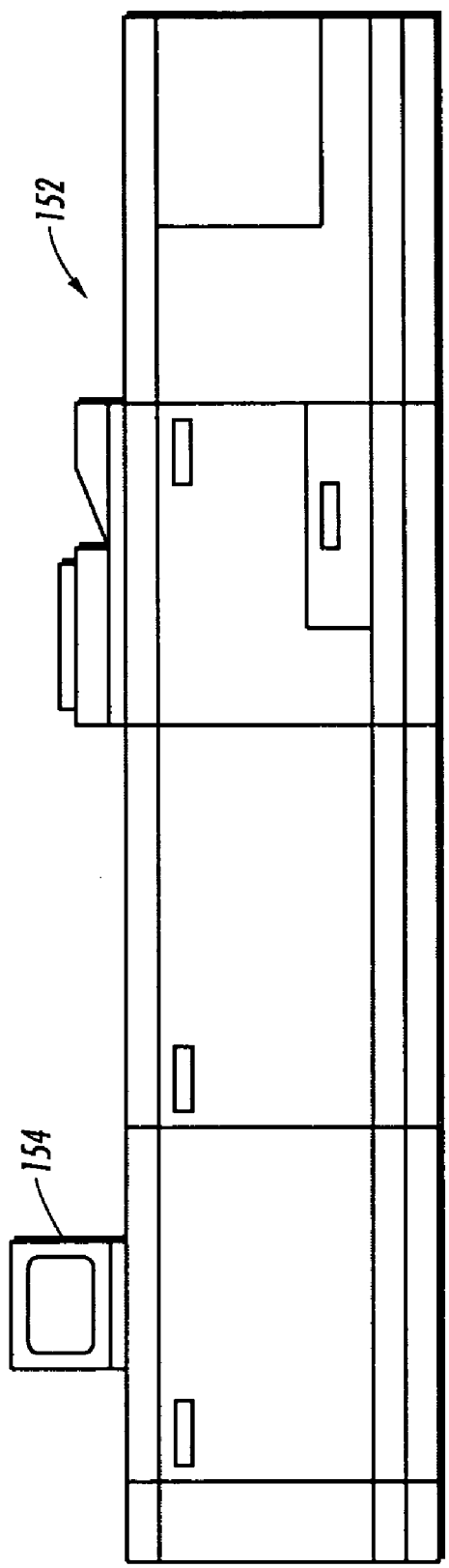
FIG. 12 is a representation of a reprographic system suitable for implementing concepts of the present application.

With reference to FIG. 12, an exemplary reprographic system 152 is shown, including a computer system 154 suitable for programming pad printing via the exemplary programming screens previously shown. The computer system 154 may be an integral part of the reprographic system 152 as shown, or maybe a separate computer system in operative communication with the reprographic system 152 by means of, e.g., a network connection or by transfer of storage media, such as, for example, optical storage discs, magnetic tapes, and other media known in the art.

Figure 13:
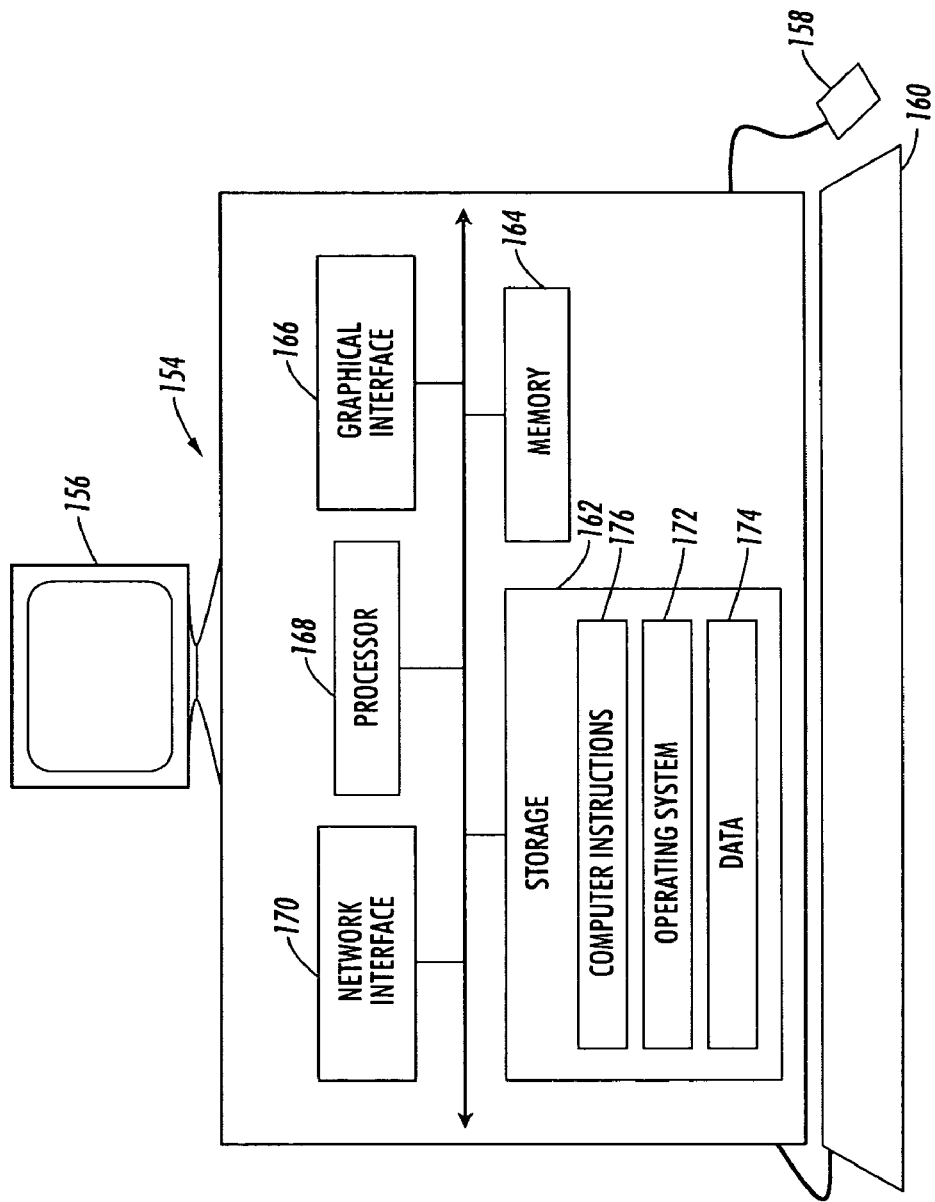
FIG. 13 is a block diagram of a computer system suitable for implementing processes of the present application.

FIG. 13 shows a more detailed block diagram of the computer system 154. The computer system 154 includes a user interface display 156 for display of messages and programming screens to a user of the system and also includes means for input from the user such as, e.g., a pointing device 158 and a keyboard 160. Included in the system are a storage device 162, e.g., a hard disk drive, random access memory 164, a graphical interface 166 for communicating via the display 156, a processor 168 for controlling all operations of the computer system 154, and a network interface 170 for communicating with other systems such as, e.g., reprographic systems. The storage device 162, in the embodiment shown, stores an operating system 172, data 174, and computer instructions 176 that are executed by the processor 168 out of the memory 164 for performing pad printing programming processes described herein.

Figure 14:
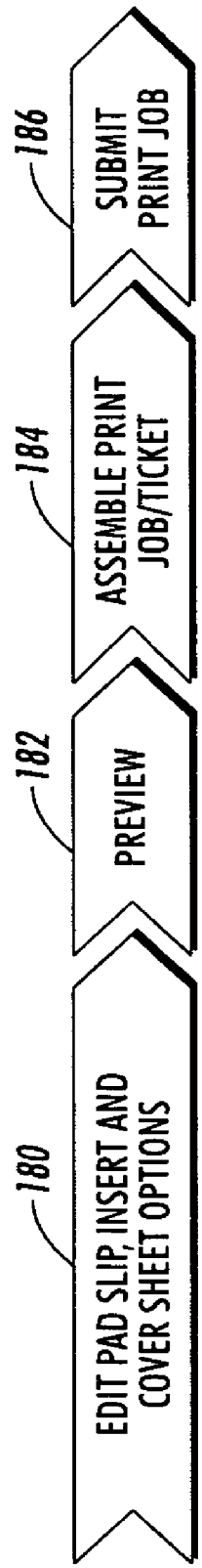
FIG. 14 is a generalized flow diagram for programming a pad printing job according to concepts of the present application.

With reference now to FIG. 14, there is shown in summary block diagram form the overall steps for programming a pad print job. In a first step 180, a user edits slip sheet, insert sheet and cover sheet options for the printed pad being programmed. The editing step is preferably performed on the computer system 154 which, as previously described, may be an integral part of the reprographic system 152 or may be a standalone computer system. In preferred embodiments, the user may invoke an option at step 182 to preview a likeness of the pad to be printed. When satisfied with the programmed slip sheet, insert sheet and cover sheet options, the user can assemble the print job at step 184 in preparation for the final printing of the pads. The user may, optionally, also prepare a job ticket according to methods known in the art describing the various options prepared in the editing step 180. In some embodiments, however, the edited options may be included as metadata within the assembled print job itself such as, e.g., metadata commands embedded in a Postscript file. The assembled job is then submitted at step 186 for printing. The job may be submitted by any of the means previously described herein such as, e.g., by means of a network connection, various storage media, or directly from the storage system of the computer 154 when the computer is an integral part of the reprographic system 152.

Figure 15:
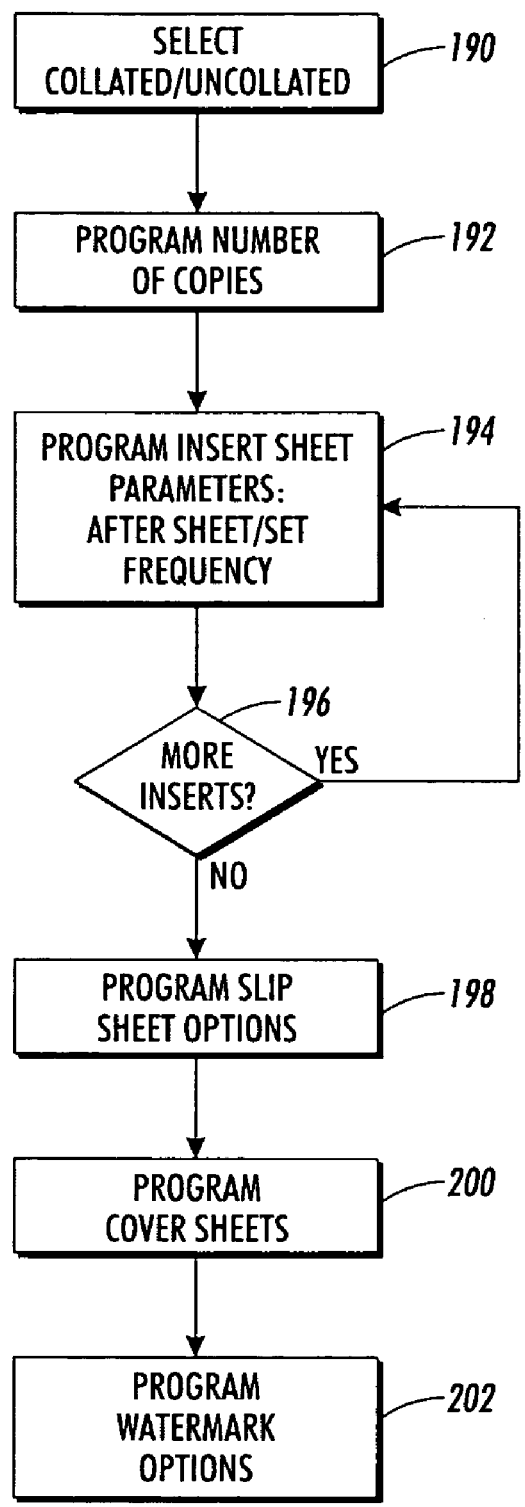
FIG. 15 is a flow diagram for programming pad printing job features according to concepts of the present application.

With reference to FIG. 15, and continued reference to FIGS. 9-11, an exemplary flow diagram for programming pad printing job features is provided. While the screens shown in FIGS. 9-11 were exemplary screens for programming a pad printing job via an application such as, e.g., a word processor and then submitting the programmed job to a reprographic system or printer, it is to be appreciated that such programming can take place on the reprographic system itself or other computer system in communication with the reprographic system. Regardless of where the programming is performed, however, the essential steps and features of the programming are similar. For example, the user performing the programming selects either collated pad printing or uncollated pad printing (190). The number of copies is programmed (192), and the various previously-described insert sheet parameters are programmed as required (194, 196). Parameters are also preferably programmed for slip sheet options (198), cover sheets (200), and watermarks (202). It is also to be appreciated that the above-described programming not necessarily performed in any particular order, and can be adapted to suit the needs of any particular embodiment.

Figure 16:
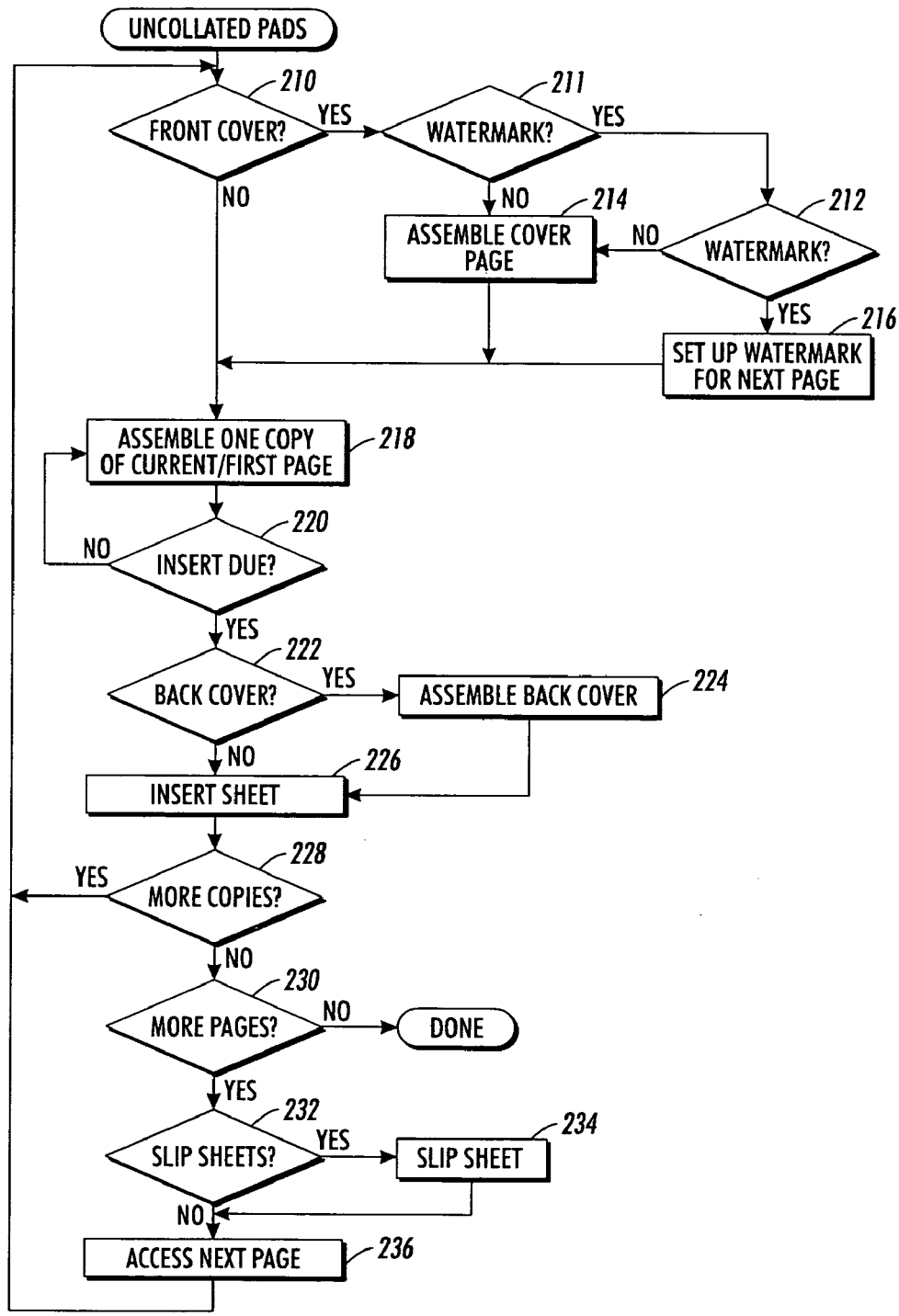
FIG. 16 is a flow diagram for an uncollated pad printing job generation according to concepts of the present application.

With reference now to FIG. 16, a flow diagram is shown presenting an exemplary method for assembling an uncollated pad print job and/or job ticket. It is to be understood that the flow diagram shown is for illustrative purposes only to aid in the understanding of the present application and the above-described programming steps. The present application is not limited to the particular steps shown, or to the order of the steps shown. It is first determined at step 210 whether a front cover is to be printed. If a front cover is specified, it is then determined at step 211 if the cover sheet is to be printed on a blank sheet or as a watermark. If the cover sheet is to print as a watermark, it is determined at step 212 if the watermark should be printed on the first input document page, or if it should be printed on an additional first page. If the cover sheet is to print on a blank page or as a watermark on an additional page, the cover sheet is assembled at step 214 and, if the cover sheet is to print as a watermark on the first document page, a watermark is prepared for inclusion on the first sheet of the pad. In all cases, processing continues at step 218 where one copy of the current/first page is assembled. Following assembly of each page, it is determined at step 220 whether an insert sheet is due for insertion into the stack and, if not, another copy of the page is assembled at step 218. Otherwise, at step 222 it is determined whether or not a back cover has been specified and, if so, a back cover is assembled in the output document at step 224. Subsequently, an insert sheet is assembled for insertion at step 226. It is then determined if more copies of the current page are specified at step 228 and, if so, processing returns to the previously described front cover determination step 210. When all copies of the current page have been assembled, it is determined at step 230 if there are any remaining pages to be assembled into the pad and, if not, processing is completed. Otherwise, processing continues at step 232 where it is determined whether or not slip sheets have been coded for insertion into the pad. If slip sheets have been programmed, a slip sheet is assembled into the output job at step 234. The next page to be processed is accessed at step 216 and processing returns to the previously described front cover determination step 210.

Figure 17:
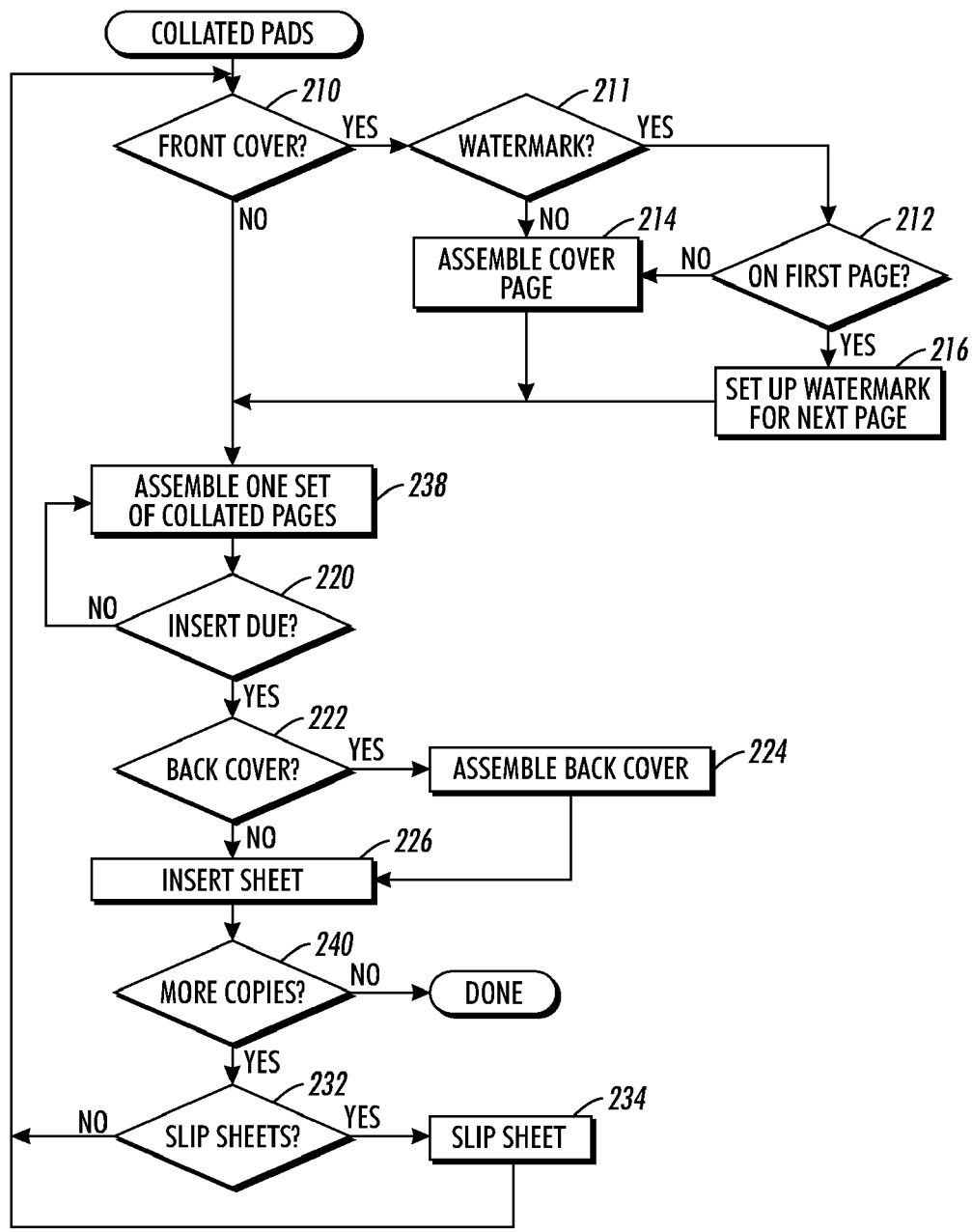
FIG. 17 is a flow diagram for a collated pad printing job generation according to concepts of the present application.

With reference now to FIG. 17, a flow diagram is shown presenting an exemplary method for assembling a collated pad print job and/or job ticket. It is again to be understood that the flow diagram shown is for illustrative purposes only to aid in the understanding of the present application. Numerals identical to those shown in FIG. 15 represent steps that are identical to the processing steps for uncollated pads. In particular, front cover and watermark processing steps 210-216 are identical to the previously described process for uncollated pads. Following this, one complete set of collated pages is assembled at step 238. It is then determined at step 240 whether an insert sheet is due for insertion into the stack and, if not, another set of collated pages is assembled at step 238. Otherwise, at step 222 it is determined whether or not a back cover has been specified and, if so, a back cover is assembled in the output document at step 224. Subsequently, an insert sheet is assembled for insertion at step 226. It is then determined if more copies of the current page are specified at step 220 and, if not, processing is completed. Otherwise, slip sheet processing occurs as previously described at steps 232-234, and processing returns to the previously described front cover determination step 210.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A non-transitory computer program product comprising a tangible medium encoding instructions which, when executed, perform the method comprising:
programming a slip sheet parameter, the slip sheet parameter selected from at least one of a slip sheet yes value or a slip sheet no value;
programming insert sheet parameters for demarcating a quantity of output from an input document including at least two different input pages, the insert sheet parameters including:
programming at least one first sheet insertion point, the at least one first sheet insertion point specifying a programmed insertion of an insert sheet between select output pages of the output;
for a collated output, programming an insertion frequency for inserting a second insertion sheet, the insertion frequency specifying a select multiple number of sets of the input document included in each pad being defined between the first and second insert sheets; and
for an uncollated output, programming the insertion frequency for inserting the second insertion sheet, the second insertion sheet for specifying a select multiple number of copies of each of the input pages included in the each pad being defined between the first and second insert sheets;
wherein the each pad includes greater than one and less than the quantity of each input page of the input document; and
programming cover sheet parameters, the cover sheet parameters including at least one of a cover sheet yes value and a cover sheet no value.

2. The method set forth in claim 1, the method further comprising:
programming a collating parameter, the collating parameter selected from at least one of collated and uncollated, wherein:
the first sheet insertion point specifies a first page number and the insertion frequency specifies the multiple number of copies if the collating parameter is uncollated; and
the first sheet insertion point specifies a first set number and the insertion frequency specifies the multiple number of sets if the collating parameter is collated.

3. The method set forth in claim 1, the programming cover sheet parameters step including at least one of:
programming the cover sheet to print on a blank sheet; and
programming the cover sheet to print as a watermark.

4. The method set forth in claim 3, the programming the cover sheet to print as a watermark step including at least one of:
programming the cover sheet to print as the watermark on an additional pad page; and
programming the cover sheet to print as the watermark on a first pad page.

5. The method set forth in claim 1, the method further comprising:
programming at least one number of copies parameter, wherein each page of an input document can be programmed for an associated number of copies.

6. The method set forth in claim 1, the method further comprising:
generating a Page Description Language Document containing an input document based on the programmed parameters and selected ones of the programmed parameters.

7. A non-transitory computer program product comprising a tangible medium encoding instructions which, when executed, perform the method comprising:
programming by a user a set of pads formed of multiple uncollated parts, including:
a front cover feature;
a non-uniform pad size feature using a properties menu input box, including:
programming at least two insert sheets for demarcating a quantity of output for an input document including at least two different pages;
for a collated document, programming the demarcating of the output into alternating first pads and second pads different from the first pads, wherein the first pads and the second pads include an unequal number of sets of the input document;
for an uncollated document, programming the demarcating of the output into the first pads and the second pads, wherein the first pads and the second pads include an unequal number of copies of a same one of the input pages; and
a system data feature.

8. The method set forth in claim 7, the method further comprising:
programming a multi-part pad feature, including:
a first sheet insertion point, the first sheet insertion point specifying a programmed insertion of a first insertion sheet for demarcating the quantity of output into a preselected number of pads; and
a first insertion frequency for specifying a number of input pages or sets of input documents between two insert sheets;
a second sheet insertion point different from the first sheet insertion point, the second sheet insertion point specifying a programmed insertion of a second insertion sheet relative to the first insertion point; and,
a second insertion frequency for specifying a number of the pages or the set of pages between second insert sheets and the first insert sheets.

9. The method set forth in claim 8, the programming a multi-part pad feature step including:
programming a collating feature for collating the pages of the input document for the printed pad.

10. The method set forth in claim 7, the programming a front cover feature step including:
programming the cover sheet to print on an additional page of the printed pad; and
programming the cover sheet to print as a watermark.

11. The method set forth in claim 10, the programming the cover sheet to print as a watermark step including at least one of:
programming the cover sheet to print as the watermark on an additional pad page; and
programming the cover sheet to print as the watermark on a pad page corresponding to a selected input document page.

12. The method set forth in claim 11, wherein the selected input document page is the first input document page.

13. The method set forth in claim 7, the programming a non-uniform pad size feature step including:
programming at least one first sheet insertion point feature.

14. The method set forth in claim 13, the programming a non-uniform pad size feature step further including:
programming at least one insertion frequency feature.

15. The method set forth in claim 7, the method further comprising:
generating a Page Description Language Document containing the input document arranged based on the programmed features and selected ones of the programmed features.

16. The method set forth in claim 15, wherein the generated Page Description Language Document contains system data based on the programmed system data feature.

17. A system for programming jobs for pad printing, the system comprising:
a graphical user interface for receiving input from a user, wherein the input includes programming instructions for printing a set of pads based on an input document, the programming instructions including:
front cover instructions;
non-uniform pad size instructions operable to program an insertion of insert sheets between a quantity of output for an input document including at least two different pages, the instructions adapted to:
program at least two insert sheets for demarcating a quantity of output for an input document including at least two different pages;
for a collated document, demarcate the output into alternating first pads and second pads different from the first pads, wherein the first pads and the second pads include an unequal number of sets of the input document;
for an uncollated document, demarcate the output into the first pads and the second pads, wherein the first pads and the second pads include an unequal number of copies of a same one of the input pages; and
system data instructions;
computer instructions for generating printer instructions and for assembling the input document and generated printer instructions based on the programmed instructions;
a storage device for storing the input document, the programming instructions, and the computer instructions;
random access memory for temporarily storing at least portions of: the document; the programming instructions; and the computer instructions;
a processor for controlling all operations of the system; and
a network interface for communicating with other systems.

18. The system set forth in claim 17, the programming instructions further including:
multi-part pad instructions include:
a first sheet insertion point, the first sheet insertion point specifying a programmed insertion of a first insertion sheet for demarcating the quantity of output into a preselected number of pads; and
a first insertion frequency for specifying a number of input pages or sets of input documents between two insert sheets;
a second sheet insertion point different from the first sheet insertion point, the second sheet insertion point specifying a programmed insertion of a second insertion sheet relative to the first insertion point; and,
a second insertion frequency for specifying a number of the pages or the set of pages between second insert sheets and the first insert sheets.

19. The system set forth in claim 18, the multi-part pad instructions including:
collating instructions for collating the pages of the input document for the printed multi-part pad.

20. The system set forth in claim 17, the front cover instructions including:
cover sheet instructions for printing the cover sheet on an additional page of the printed pad; and
cover sheet instructions for printing the cover sheet as a watermark.

* * * * *